UNITED STATES PATENT OFFICE.

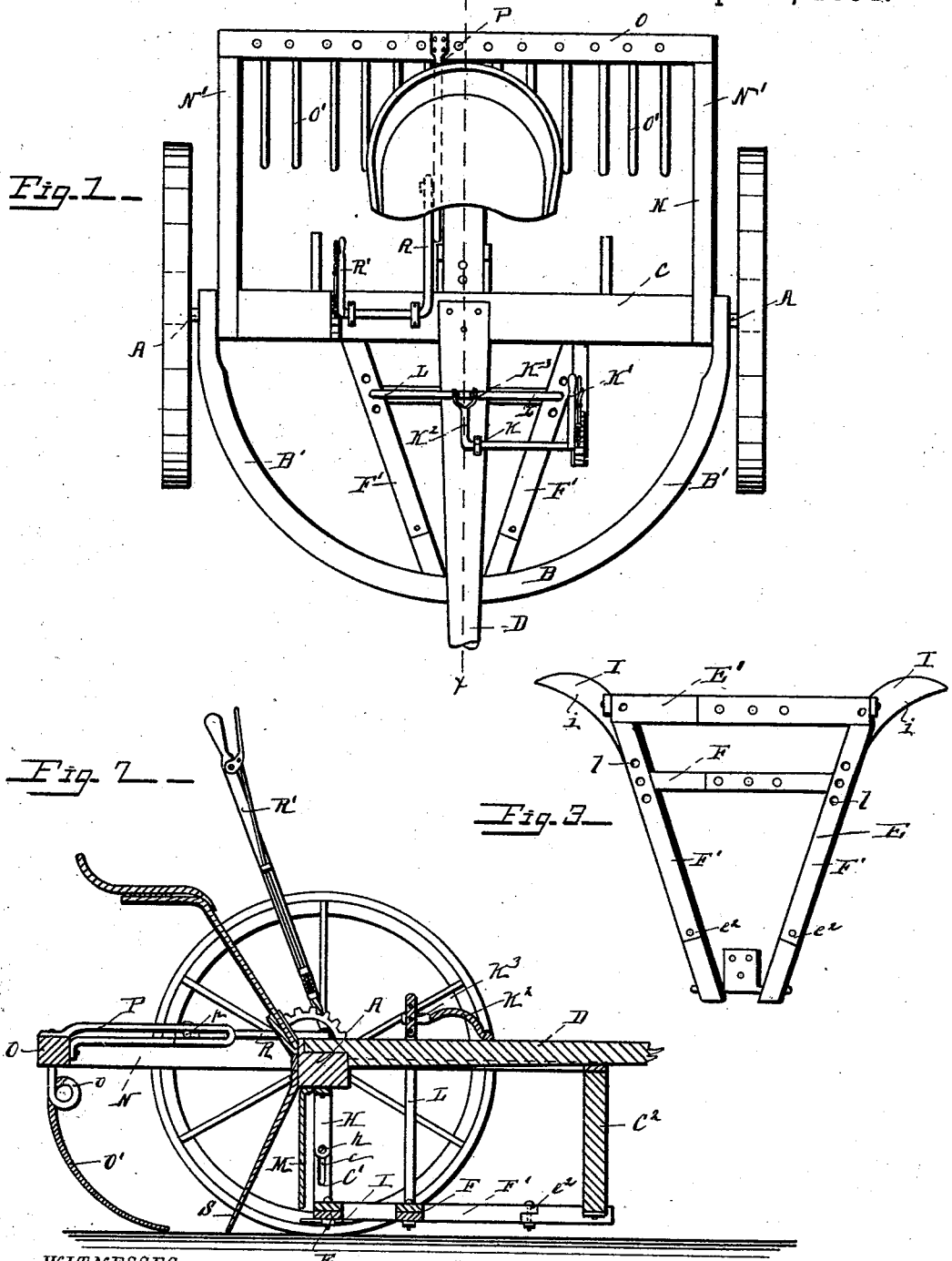

JOSEPH PRIESTLEY, OF McKINNEY, TEXAS.

COMBINED STALK-CUTTER AND RAKE.

SPECIFICATION forming part of Letters Patent No. 517,766, dated April 3, 1894.

Application filed June 30, 1893. Serial No. 479,251. (No model.)

*To all whom it may concern:*

Be it known that I, JOSEPH PRIESTLEY, a citizen of the United States, and a resident of McKinney, in the county of Collin and State of Texas, have invented certain new and useful Improvements in a Combined Stalk-Cutter and Rake; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view of the machine. Fig. 2 is a vertical longitudinal section of same taken on line $x\ x$ Fig. 1, and Fig. 3 is a view in detail of the cutter carrying frame.

This invention has relation to certain new and useful improvements in combined stalk cutters and rakes, and it consists in the novel construction and combination of parts, all as hereinafter specified.

In the accompanying drawings, the letter A refers to the axles supported by the ground wheels journaled thereon.

B designates the main frame of the machine, comprising the curved bars B', B', secured at their rear ends on the axle, inside the wheels, and united at their forward ends, the axle bar C, the tongue D connected to said bar C, and to the connecting portion of the bars B', B'.

E is the cutter carrying frame, which is of triangular form, the rear bar E' being formed in two overlapping sections, as shown in order to permit the adjustment of the frame to different widths. F is a jointed cross brace for said frame. The side bars F' are loosely connected to the bar E' at their rear ends, and at their forward ends are secured to an arm $C^2$, and are jointed at $e^2$, so that they are capable of the necessary lateral movement when the frame is adjusted to different widths. The rear end of said cutter-carrying frame is adjustably supported by means of the arms C', C', having thereon elongated arcuate slots c, which loosely engage a transverse rod or bar H supported from the under side of the bar C of the main frame by a hanger H'.

I, I, are the cutters which are secured to the rear angles of the frame E, projecting laterally and obliquely therefrom, and having concave cutting edges $i$.

K is an angular rock lever for operating the cutter carrying frame, said lever having a handle portion K' projecting upwardly within reach from the driver's seat. Said lever is hung on the main frame at $k$, and has a rearwardly turned arm $K^2$ which is adjustably connected by clevis $K^3$ to the upper united ends of arms L, L, connected at their lower ends to the side bars of the frame E. The point of connection of these arms with said frame may be adjusted as indicated at $l$, according as the frame is set to a greater or less width. By pushing the lever handle K' forwardly, an upward pull will be given the arms L, L, which elevates the rear portion of the frame E and the cutters, such elevation being permitted by the slots $g$ in the arms C'. The entire main frame together with the cutter frame, it will be observed, has a rocking, pivotal movement with relation to the supporting wheels. The space between the rear end of the cutter frame and the main frame is closed as indicated at M, in order to prevent the frame from becoming clogged with stalks and trash.

N designates the rake frame, comprising the side bars N' loosely engaging the axles at their forward ends, and projecting rearwardly, being connected at their opposite ends by the rake head O, having thereon a series of teeth O'. Said teeth are preferably of spring wire, having a coil $o$ thereon, and carried downward and forward toward the cutters and cutter frame. Projecting forwardly from the central portion of the rake head is a loop arm P which is engaged by a projection $p$ on the arm of an angular rock lever R, hung on the axle bar C of the main frame, and having a handle portion R' projecting within reach of the driver's seat. By pushing this lever forwardly, the rake frame will be elevated to raise the teeth from the surface. Extending downwardly and rearwardly from the axle bars in to close proximity to the teeth is a series of three or more arms S, which hold the stalks in place as they are gathered by the rake.

Owing to the fact that the frame E is capable of different degress of adjustment, it will be apparent that the machine may be easily adapted for use for cutting stalks the runs of which are at different distances apart.

Having described my invention, what I claim, and desire to secure by Letters Patent, is—

1. In a combined stalk cutter and rake, the combination of the main frame, the hanger attached to the under side of the axle-bar of said frame, the cutter-carrying frame E, the arms C', C', at the rear portion of said frame E, a transverse rod or bar $h$ engaging said hanger and also engaging arcuate slots in said arms C', C', the support for the forward end of said frame E, means for securing a lateral adjustment of the side bars of said frame with relation to each other, the rock-lever and connections for operating said frame, and the rake to the rear of said frame, substantially as specified.

2. In a combined stalk cutter and rake, the combination with the axle, the rake frame and rake, of the rocking main frame, cutter-carrying frame suspended from said frame, said cutter-carrying frame having a lateral and a vertical adjustment, and the operating lever therefor, substantially as specified.

3. In a combined stalk cutter and rake, the combination with the axle, and the rake frame and rake, of the rocking main frame, the arm depending from the central forward portion of said frame, the hanger depending from the axle bar, the cutter-carrying frame loosely connected at its respective ends to said arm and hanger, and thereby capable of a vertical adjustment with relation to the main frame, the side bars of said carrying frame having a lateral adjustment with relation to each other, the cutters, and the operating lever, substantially as specified.

In testimony whereof I affix my signature in presence of two witnesses.

JOSEPH $\overset{\text{his}}{\times}$ PRIESTLEY.
mark

Witnesses:
A. C. VARNER,
RUSSELL DE ARMOND.